(12) United States Patent
Dugas et al.

(10) Patent No.: US 10,363,519 B2
(45) Date of Patent: Jul. 30, 2019

(54) AQUEOUS ALKANOLAMINE COMPOSITION AND PROCESS FOR THE SELECTIVE REMOVAL OF HYDROGEN SULFIDE FROM GASEOUS MIXTURES

(71) Applicant: Dow Global Technologies LLC, Midland, MI (US)

(72) Inventors: Ross E. Dugas, Pearland, TX (US); Christophe R. Laroche, Lake Jackson, TX (US); Jonathan W. Leister, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/573,975

(22) PCT Filed: May 17, 2016

(86) PCT No.: PCT/US2016/032875
§ 371 (c)(1),
(2) Date: Nov. 14, 2017

(87) PCT Pub. No.: WO2016/187199
PCT Pub. Date: Nov. 24, 2016

(65) Prior Publication Data
US 2018/0290101 A1    Oct. 11, 2018

Related U.S. Application Data

(60) Provisional application No. 62/164,059, filed on May 20, 2015.

(51) Int. Cl.
*B01D 53/52*     (2006.01)
*B01D 53/14*     (2006.01)
(Continued)

(52) U.S. Cl.
CPC ..... *B01D 53/1493* (2013.01); *B01D 53/1425* (2013.01); *B01D 53/1468* (2013.01);
(Continued)

(58) Field of Classification Search
CPC ........ B01D 53/52; B01D 53/77; B01D 53/78; B01D 53/96; B01D 53/1468;
(Continued)

(56) References Cited

U.S. PATENT DOCUMENTS

| 4,336,233 A | 6/1982 | Appl et al. |
| 4,997,630 A | 3/1991 | Wagner et al. |

(Continued)

FOREIGN PATENT DOCUMENTS

| EP | 0134948 | 3/1985 |
| WO | 2014004019 | 1/2014 |
| WO | 2014004020 | 1/2014 |

OTHER PUBLICATIONS

R.R. BOTTOMS, Organic Amines-Girbotol Process, The Science of Petroleum, 1938, pp. 1810-1815, vol. 3, Oxford University Press.

*Primary Examiner* — Daniel Berns

(57) ABSTRACT

The present invention relates to an aqueous alkanolamine solution and use therein a process for the selective removal of hydrogen sulfide from gaseous mixtures comprising hydrogen sulfide. The aqueous alkanolamine solution consists of —an amino compound with the formula: $R^1R^2NCH_2CH(OH)CH_2OH$ wherein $R^1$ and $R^2$ independently represent methyl, ethyl, propyl or isopropyl groups —and bis(2-hydroxyethyl)methylamine, —optionally one or more of a physical solvent, an antifoaming agent, an antioxidant, a corrosion inhibitor, a film former, a chelating agent or a pH adjuster and —water The process for selectively removing hydrogen sulfide, comprising the step of contacting the gaseous mixture with the aqueous
(Continued)

alkanolamine solution, preferably wherein the temperature of the aqueous alkanolamine solution is equal to or greater than 140° F.

6 Claims, 2 Drawing Sheets

(51) Int. Cl.
  *B01D 53/77* (2006.01)
  *B01D 53/78* (2006.01)
  *B01D 53/96* (2006.01)
  *C07C 215/10* (2006.01)
  *C07C 211/08* (2006.01)

(52) U.S. Cl.
  CPC .............. *B01D 2252/20405* (2013.01); *B01D 2252/20431* (2013.01); *B01D 2252/20489* (2013.01); *B01D 2252/504* (2013.01); *B01D 2252/606* (2013.01); *B01D 2252/608* (2013.01)

(58) Field of Classification Search
  CPC ........ B01D 53/1493; B01D 2252/2023; B01D 2252/20405; B01D 2252/20431; B01D 2252/20484; B01D 2252/20489; B01D 2252/50; B01D 2252/504; B01D 2252/60; B01D 2252/602; B01D 2252/604; B01D 2252/608; B01D 2257/304; C07C 215/10; C07C 211/08
  See application file for complete search history.

(56) References Cited

U.S. PATENT DOCUMENTS 5,736,116 A  4/1998  LeBlanc et al.
6,337,059 B1  1/2002  Schubert et al.

US 10,363,519 B2

AQUEOUS ALKANOLAMINE COMPOSITION AND PROCESS FOR THE SELECTIVE REMOVAL OF HYDROGEN SULFIDE FROM GASEOUS MIXTURES

FIELD OF THE INVENTION

The present invention relates to an aqueous alkanolamine composition preferably consisting of a mixture of 3-(dimethylamino)-1,2-propanediol and bis(2-hydroxyethyl)methylamine, and a process for using said aqueous composition for selectively removing $H_2S$, from gaseous mixtures, preferably, removing $H_2S$ from gaseous mixtures under conditions wherein the aqueous alkanolamine solution is at an elevated temperature.

BACKGROUND OF THE INVENTION

Fluid streams derived from natural gas reservoirs, petroleum or coal, often contain a significant amount of acid gases, for example carbon dioxide ($CO_2$), hydrogen sulfide ($H_2S$), sulfur dioxide ($SO_2$), carbon disulfide ($CS_2$), hydrogen cyanide (HCN), carbonyl sulfide (COS), or mercaptans as impurities. Said fluid streams may be gas, liquid, or mixtures thereof, for example gases such as natural gas, refinery gas, hydrocarbon gasses from shale pyrolysis, synthesis gas, and liquids such as liquefied petroleum gas (LPG) and natural gas liquids (NGL).

Various compositions and processes for removal of acid gasses are known and described in the literature. It is well-known to treat gaseous mixtures with aqueous amine solutions to remove these acidic gases. Typically, the aqueous amine solution contacts the gaseous mixture comprising the acidic gases counter currently at low temperature and high pressure in an absorber tower. The aqueous amine solution commonly contains an alkanolamine such as triethanolamine (TEA), methyldiethanolamine (MDEA), diethanolamine (DEA), monoethanolamine (MEA), diisopropanolamine (DIPA), or 2-(2-aminoethoxy)ethanol (sometimes referred to as diglycolamine or DGA). In some cases, an accelerator, is used in combination with the alkanolamines, for example piperazine and MDEA as disclosed in U.S. Pat. Nos. 4,336,233; 4,997,630; and 6,337,059. Alternatively, EP 0134948 discloses mixing an acid with select alkaline materials such as MDEA, to provide enhanced acid gas removal. However, EP0134948 teaches that only a select class of alkaline materials mixed with an acid is useable in aqueous alkaline solutions to provide increased acid gas removal.

Tertiary amines, such as 3-dimethylamino-1,2-propanediol (DMAPD), have been shown to be effective at removing $CO_2$ from gaseous mixtures, see U.S. Pat. No. 5,736,116 or DMAPD in conjunction with piperazine, see WO2014/004019, or DMAPD in conjunction with an acid, see WO 2014/004020. Further, in specific processes, e.g., the Girbotol Process, tertiary amines have been shown effective in removal of $H_2S$, but show decreased capacity at elevated temperatures, for examples see "Organic Amines-Girbotol Process", Bottoms, R. R., The Science of Petroleum, volume 3, Oxford University Press, 1938, pp 1810-1815.

While the above compounds are effective, they each have limitations which detract from their universal use. In particular, it would be desirable to have an aqueous composition comprising an alkanolamine for removing $H_2S$ from a gaseous mixture and/or an aqueous alkanolamine solution which is efficient at removing acid gases at a commercially viable capacity when the aqueous solution is used at an elevated temperature, for example above 140° F.

As such, there is a need for an aqueous alkanolamine solution and method to use said solution, which is effective at removing hydrogen sulfide from gaseous mixtures and/or removing hydrogen sulfide at elevated operating temperatures.

SUMMARY OF THE INVENTION

The present invention is a process using an aqueous alkanolamine solution composition for selectively removing hydrogen sulfide ($H_2S$) through contact with a gaseous mixture comprising hydrogen sulfide and one or more additional acid gas, such as carbon dioxide ($CO_2$), sulfur dioxide ($SO_2$), carbon disulfide ($CS_2$), hydrogen cyanide (HCN), carbonyl sulfide (COS), or a mercaptan, preferably wherein the temperature of the aqueous alkanolamine solution is equal to or greater than 140° F., said composition consists of (i) an amino compound, preferably in an amount from 0.1 to 75 weight percent, having the general formula:

wherein $R^1$ and $R^2$ independently represent lower alkyl groups of 1 to 3 carbon atoms, for example, methyl, ethyl, propyl, and isopropyl groups, more preferred $R^1$ and $R^2$ groups include methyl and ethyl groups, especially preferred amino compounds include 3-dimethylamino-1,2-propanediol in which $R^1$ and $R^2$ are both methyl groups, and 3-diethylamino)-1,2-propanediol in which $R^1$ and $R^2$ are both ethyl groups; (ii) from 0.1 to 75 weight percent of bis(2-hydroxyethyl)methylamine; and (iii) from water 0.1 to 90 and (iv) optionally one or more of a physical solvent, an antifoaming agent, an antioxidant; a corrosion inhibitor, a film former, a chelating agent, or a pH adjuster, wherein weight percents are based on the total weight of the aqueous alkanolamine solution.

In one embodiment of the present invention, the process further comprises the step of steam stripping the aqueous alkanolamine solution such that a hydrogen sulfide-lean aqueous alkanolamine solution is formed which may be used in said contacting step.

DETAILED DESCRIPTION OF THE INVENTION

Figure 1:
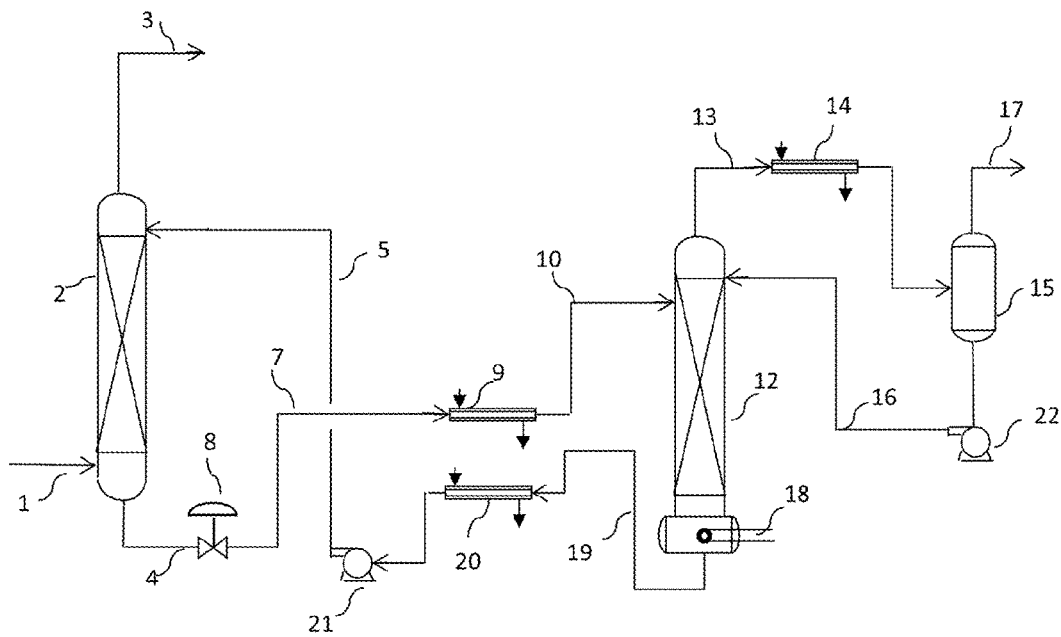
FIG. 1 illustrates a process flow diagram of an absorption process according the present invention.

The aqueous alkanolamine solution of the present invention comprises an alkanolamine. The alkanolamine useful in the aqueous amine solutions of the present invention have the general formula:

wherein $R^1$ independently represent lower alkyl groups of 1 to 3 carbon atoms, for example, methyl, ethyl, propyl, and isopropyl groups. More preferred $R^1$ and $R^2$ groups include methyl and ethyl groups. Especially preferred amino compounds include 3-(dimethylamino)-1,2-propanediol in which $R^1$ and $R^2$ are both methyl groups, and 3-(diethylamino)-1,2-propanediol in which $R^1$ and $R^2$ are both ethyl groups.

The aqueous alkanolamine solution of the present invention contains the alkanolamine in an amount equal to or greater than 0.1 weight percent, preferably equal to or greater than 5 weight percent, more preferably equal to or greater than 10 weight percent and even more preferably equal to or greater than 20 weight percent wherein weight percent is based on the total weight of the aqueous alkanolamine solution. The aqueous alkanolamine solution of the present invention contains the alkanolamine in an amount equal to or less than 75 weight percent, preferably equal to or less than 65 weight percent, more preferably equal to or less than 55 weight percent and even more preferably equal to or less than 50 weight percent wherein weight percent is based on the total weight of the aqueous alkanolamine solution.

The aqueous absorbent composition of the present invention may contain one or more additional amino compound. Preferably, the additional amino compound is a different or second alkanolamine not described by formula (1) herein above, such as tris(2-hydroxyethyl)amine (triethanolamine, TEA); tris(2-hydroxypropyl)amine (triisopropanol); tributanolamine; bis(2-hydroxyethyl)methylamine (methyldiethanolamine, MDEA); 2-diethylaminoethanol (diethylethanolamine, DEEA); 2-dimethylaminoethanol (dimethylethanolamine, DMEA); 3-dimethylamino-1-propanol; 3-diethylamino-1-propanol; 2-diisopropylaminoethanol (DIEA); N,N-bis(2-hydroxypropyl)methylamine (methyldiisopropanolamine, MDIPA); N,N'-bis(2-hydroxyethyl)piperazine (dihydroxyethylpiperazine, DiHEP)); diethanolamine (DEA); 2-(tert-butylamino)ethanol; 2-(tert-butylaminoethoxy)ethanol; or 2-amino-2-methylpropanol (AMP), 2-(2-amino-ethoxy)ethanol.

The amount of optional amino compound in the aqueous alkanolamine solution may range from equal to or greater than 0.1 weight percent, preferably equal to or greater than 1 weight percent, more preferably equal to or greater than 5 weight percent based the total weight of the aqueous alkanolamine solution. If present, the amount of optional amino compound in aqueous alkanolamine solution may range from equal to or less than 75 weight percent, preferably equal to or less than 50 weight percent, more preferably equal to or less than 25 weight percent based the total weight of the aqueous alkanolamine solution.

In one embodiment of the present invention the aqueous solvent of the present invention consists of DMAPD, MDEA, and water.

In one embodiment of the present invention the aqueous solvent of the present invention consists of DMAPD, MDEA, and water and no other amino compounds, in particularly no piperazine.

In one embodiment of the present invention the aqueous solvent of the present invention consists of DMAPD, MDEA, water, and optionally one or more of a physical solvent, an antifoaming agent, an antioxidant; a corrosion inhibitor, a film former, a chelating agent, or a pH adjuster wherein none of the one or more additional additives is an acid or an acid-forming materials, in particular any that can be characterized as a strong acid which includes any organic or inorganic acid having a pKa of 8 or less, preferably 7 or less, more preferably 6 or less. Examples of acids that cannot be in the aqueous solvent of the present invention are phosphoric acid, phosphorus acid, boric acid, hydrochloric acid, sulfuric acid, boric acid, sulfurous acid, nitrous acid, pyrophosphoric acid, telurous acid, and organic acids such as acetic acid, formic acid, adipic acid, benzoic acid, n-butyric acid, chloroacetic acid, citric acid, glutaric acid, lactic acid, malonic acid, oxalic acid, o-phthalic acid, succinic acid, and o-toluic acid.

For removing $H_2S$ from a gaseous mixture, the temperature of the aqueous alkanolamine solution which is brought into contact with the gas to be treated is equal to or greater than 120° F., preferably equal to or greater than 130° F., more preferably equal to or greater than 140° F., and even more preferably equal to or greater than 150° F.

In a particularly useful embodiment of the present invention, the temperature of the aqueous alkanolamine solution which is brought into contact with the gas to be treated is equal to or greater than 140° F.

In addition to the alkanolamine and the additional amino compound, the aqueous alkanolamine solution may comprise one or more other compounds used in fluid treatment following well known practices. Illustrative compounds which may optionally be provided include, but are not limited to, one or more of the following: antifoaming agents; physical solvents including glycols and the mono- and di-ethers or esters thereof, aliphatic acid amides, N-alkylated pyrrolidones, sulfones, and sulfoxides; antioxidants; corrosion inhibitors; film formers; chelating agents such as metals; pH adjusters such as alkali compounds. The amount of these optional components is not critical but may be provided in an effective amount following known practices.

Suitable physical solvents are cyclotetramethylenesulfone (available under the tradename SULFOLANE, dimethyl ethers of polyethylene glycol (available under the tradename SELEXOL from The Dow Chemical Company), and triethylene glycol monomethyl ether (TGME or METHOXYTRIGLYCOL from The Dow Chemical Company), 1,3-dimethyl-3,4,5,6-tetrahydro-2(1H)-pyrimidinone, N-formylmorpholine, N-acetylmorpholine, or mixtures thereof.

If present, the amount of physical solvent in the aqueous alkanolamine solution may be present in an amount from equal to or greater than 1 weight percent, preferably equal to or greater than 5 weight percent, more preferably equal to or greater than 10 weight percent based the total weight of the aqueous alkanolamine solution. If present, the amount of physical solvent in the aqueous alkanolamine solution may be present in an amount equal to or less than 75 weight percent, preferably equal to or less than 65 weight percent, more preferably equal to or less than 50 weight percent based the total weight of the solution.

The invention set forth herein has great application in the petrochemical and energy industries. For example, the present invention can be used for the treatment of fluid streams, gas, liquid, or mixtures, in an oil refinery, the treatment of sour gas, the treatment of coal steam gas, the treatment of hazardous stack emissions, the treatment of land field gasses, and a new series of devices dealing with hazardous emissions for human safety.

The fluid streams to be treated by the process of the present invention contain an acid gas mixture which includes $H_2S$, and may optionally include other gases such as $CO_2$, $N_2$, $CH_4$, $C_2H_6$, $C_3H_8$, $H_2$, CO, $H_2O$, COS, HCN, $NH_3$, $O_2$, and mercaptans. Often such gas mixtures are found in combustion gases, refinery gases, town gas, natural gas, syn gas, tail gas, water gas, propane, propylene, heavy hydrocarbon gases, etc. The aqueous alkanolamine solution herein is particularly effective when the fluid stream is a gaseous mixture, obtained, for example, from shale oil retort gas, coal or gasification of heavy oil with air/steam or oxygen/steam thermal conversion of heavy residual oil to lower molecular weight liquids and gases, or in sulfur plant tail gas clean-up operations.

The process of the present invention is preferably used to remove $H_2S$ from a gas stream comprising $H_2S$ optionally in the presence of one or more other acid gas impurities, for example $CO_2$, $N_2$, $CH_4$, $C_2H_6$, $C_3H_8$, $H_2$, CO, $H_2O$, COS, HCN, $NH_3$, $O_2$, and/or mercaptans. However, the present invention may be used to remove $H_2S$ and one or more of $CO_2$, $N_2$, $CH_4$, $C_2H_6$, $C_3H_8$, $H_2$, CO, $H_2O$, COS, HCN, $NH_3$, $O_2$, and/or mercaptans from a gas stream comprising $H_2S$ and one or more of $CO_2$, $SO_2$, $CS_2$, HCN, COS, and/or mercaptans.

The absorption step of this invention generally involves contacting the fluid stream, preferably gaseous mixture, with the aqueous alkanolamine solution in any suitable contacting vessel, for examples of representative absorption processes see U.S. Pat. Nos. 5,736,115 and 6,337,059. In such processes, the fluid stream containing $H_2S$ and optionally $CO_2$ and/or other impurities from which the $H_2S$ is to be removed may be brought into intimate contact with the aqueous alkanolamine solution using conventional means, such as a tower or vessel packed with, for example, rings or with sieve plates, or a bubble reactor.

In a typical mode of practicing the invention, the absorption step is conducted by feeding the fluid stream into the lower portion of the absorption tower while fresh aqueous alkanolamine solution is fed into the upper region of the tower. The fluid stream, freed largely from the $H_2S$, emerges from the upper portion (sometimes referred to as treated or cleaned gas) of the tower, and the loaded aqueous alkanolamine solution, which contains the absorbed $H_2S$, leaves the tower near or at its bottom. Preferably, the inlet temperature of the absorbent composition during the absorption step is in the range of from 100° F. to 180° F., and more preferably from 120° F. to 170° F. Pressures may vary widely; acceptable absolute pressures are between 5 and 2,000 pounds per square inch (psi), preferably 2 to 1,500 psi, and most preferably 5 to 1,000 psi in the absorber. The contacting takes place under conditions such that the $H_2S$ is preferably absorbed by the solution. The absorption conditions and apparatus are designed so as to minimize the residence time of the aqueous alkanolamine solution in the absorber to reduce $CO_2$ pickup while at the same time maintaining sufficient residence time of the fluid stream with the aqueous absorbent composition to absorb a maximum amount of the $H_2S$ gas. Fluid streams with low $H_2S$ partial pressures, such as those encountered in thermal conversion processes, will require less of the aqueous alkanolamine solution under the same absorption conditions than fluid streams with higher partial pressures.

A typical procedure for the $H_2S$ removal phase of the process comprises absorbing $H_2S$ via countercurrent contact of a gaseous mixture containing $H_2S$ and $CO_2$ with the aqueous alkanolamine solution of the amino compound in a column containing a plurality of trays at a temperature, of at least 100° F., and at a gas velocity of at least 0.3 feet per second (ft/sec, based on "active" or aerated tray surface), depending on the operating pressure of the gas, said tray column having fewer than 20 contacting trays, with, e.g., 4 to 16 trays being typically employed.

After contacting the fluid stream with the aqueous alkanolamine solution, which becomes saturated or partially saturated with $H_2S$, the solution may be at least partially regenerated so that it may be recycled back to the absorber.

As with absorption, the regeneration may take place in a single liquid phase. Regeneration or desorption of the acid gases from the aqueous alkanolamine solution may be accomplished by conventional means of heating, expansion, stripping with an inert fluid, or combinations thereof, for example pressure reduction of the solution or increase of temperature to a point at which the absorbed $H_2S$ flashes off, or by passing the solution into a vessel of similar construction to that used in the absorption step, at the upper portion of the vessel, and passing an inert gas such as air or nitrogen or preferably steam upwardly through the vessel. The temperature of the solution during the regeneration step should be in the range from 120° F. to 300° F., and preferably from 170° F. to 270° F., and the pressure of the solution on regeneration should range from 1 psi to 100 psi, preferably 10 psi to 50 psi. The aqueous alkanolamine solution, after being cleansed of at least a portion of the $H_2S$ gas, may be recycled back to the absorbing vessel. Makeup absorbent may be added as needed.

In a preferred regeneration technique, the $H_2S$-rich aqueous alkanolamine solution is sent to the regenerator wherein the absorbed components are stripped by the steam which is generated by boiling the solution. Pressure in the flash drum and stripper is usually 1 psi to 50 psi, preferably 15 psi to 30 psi, and the temperature is typically in the range from 120° F. to 340° F., preferably 170° F. to 270° F. Stripper and flash temperatures will, of course, depend on stripper pressure; thus at 15 psi to 30 psi stripper pressures, the temperature will be 170° F. to 270° F. during desorption. Heating of the solution to be regenerated may very suitably be affected by means of indirect heating with low-pressure steam. It is also possible, however, to use direct injection of steam. The resulting hydrogen sulfide-lean aqueous alkanolamine solution may be used to contact a gaseous mixture containing $H_2S$.

Preferably clean natural gas contains equal to or less than 10 ppm $H_2S$, meeting some environmental regulations, more preferably equal to or less than 4 ppm $H_2S$, meeting typical pipeline specifications.

Preferably tail gas or AGE applications gas contains equal to or less than 200 ppm, preferably equal to or less than 100 ppm, more preferably equal to or less than 50 ppm, and most preferably equal to or less than 30 ppm.

A preferred embodiment of the present invention involves performing the method of the present invention continuously, or as a continuous process. However, the method may be performed batch wise or semi-continuously. Selection of the type of process used should be determined by the conditions, equipment used, type and amount of gaseous stream, and other factors apparent to one of ordinary skill in the art based on the disclosure herein.

EXAMPLES

In the Example 1 and Comparative Examples A and B:
"MDEA" is 98% methyldiethanolamine available from The Dow Chemical Company
"DMAPD" is 98% 3-dimethylamino-1,2-propanediol available from AK scientific,
and
"$H_3PO_4$" is an 85% o-phosphoric acid available from Fisher Scientific.

Example 1 and Comparative Examples A and B are aqueous amine absorbent solutions comprising 40 weight percent of one or more alkanolamine, optionally 1 weight percent $H_3PO_4$, with the balance of the aqueous composition consisting of deionized water, weight percent is based on the total weight of the aqueous amine absorbent solution. Example 1 is 35 weight percent DMAPD and 5 weight percent MDEA, Comparative Example A is 40 weight percent MDEA, and Comparative Example B is 35 weight percent DMAPD, 5 weight percent MDEA, and 1 weight percent $H_3PO_4$.

A gas stream comprising a synthetic mixture containing 4.2 percent $H_2S$, 16 percent $CO_2$ and 79.8 percent $N_2$, wherein percent is percent by volume, is treated in a pilot scale absorber to remove the $H_2S$ and $CO_2$.

An aqueous amine absorbent solution is introduced into the pilot scale absorber FIG. 1 via feed line 5 into the upper portion of a gas-liquid countercurrent packed-bed absorption column 2. The gas stream is introduced through feed line 1 into the lower portion of column 2 at a gas flow rate of 10 standard liters per minute. The absorber pressure is adjusted to 238 psia. The clean gas (i.e., reduced amounts of $H_2S$ and $CO_2$) is discharged at the top of the absorber 2 through line 3 and residual $H_2S$ and $CO_2$ levels are determined by gas chromatography (GC) analysis. The aqueous amine solution loaded with $H_2S$ and $CO_2$ flows toward the lower portion of the absorber, and leaves via line 4.

The aqueous amine in line 4 is reduced in pressure by the level control valve 8 and flows through line 7 to heat exchanger 9, which heats the loaded aqueous alkanolamine solution. The hot rich solution enters the upper portion of the regenerator 12 via line 10. The regenerator 12 is equipped with random packing which effects desorption of the $H_2S$ and $CO_2$ gases. The pressure of the regenerator is set at 17 psia. The gases are passed through line 13 into condenser 14 wherein cooling and condensation of any residual water and amine occurs. The gases enter a separator 15 wherein the condensed liquid is separated from the vapor phase. The condensed aqueous alkanolamine solution is pumped via pump 22 through line 16 to the upper portion of the regenerator 12. The gases remaining from the condensation are removed through line 17 for final collection and/or disposal. The regenerated aqueous alkanolamine solution flows down through the regenerator 12 and the close-coupled reboiler 18. The reboiler 18, equipped with an electrical heating device, vaporizes a portion of the aqueous alkanolamine solution to drive off any residual gases. The vapors rise from the reboiler and are returned to the regenerator 12 which comingle with falling liquid and then exit through line 13 for entry into the condensation stage of the process. The regenerated aqueous alkanolamine solution from the reboiler 18 leaves through line 19 and is cooled in heat exchanger 20, and then is pumped via pump 21 back into absorber 2 through feed line 5.

The flow rate for the aqueous amine absorbent is determined by slowly adjusting downward until the amount of $H_2S$ in the purified gas line 3 shows a dramatic increase.

Figure 2:
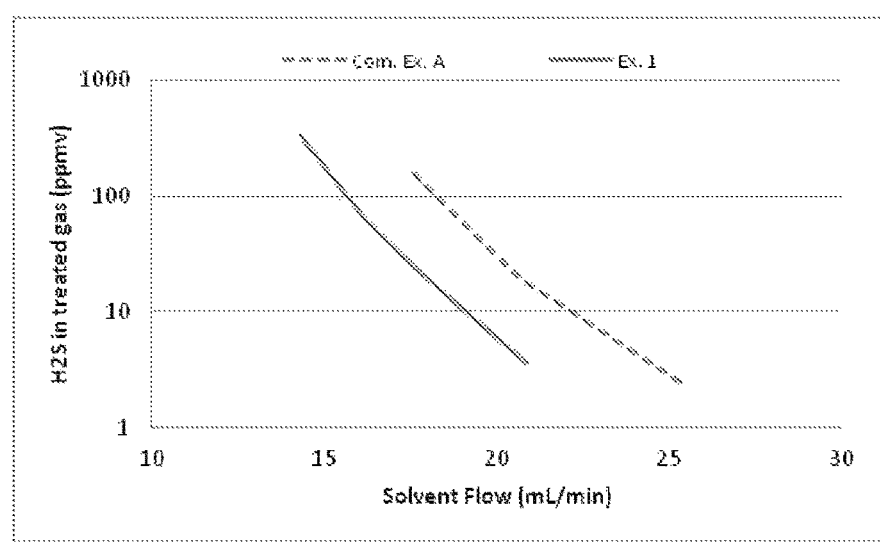
FIG. 2 is a plot of $H_2S$ concentration for a gas mixture versus the absorbent circulation rate for treatment using an example of the invention and a comparative example.
Figure 3:
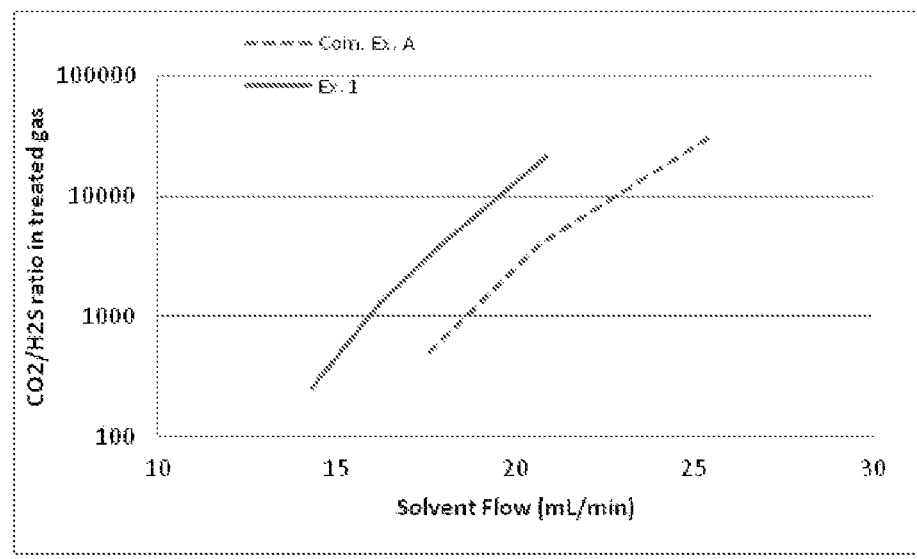
FIG. 3 is a plot of $H_2S$ concentration for a gas mixture versus the absorbent circulation rate for treatment using an example of the invention and another comparative example.
Figure 4:
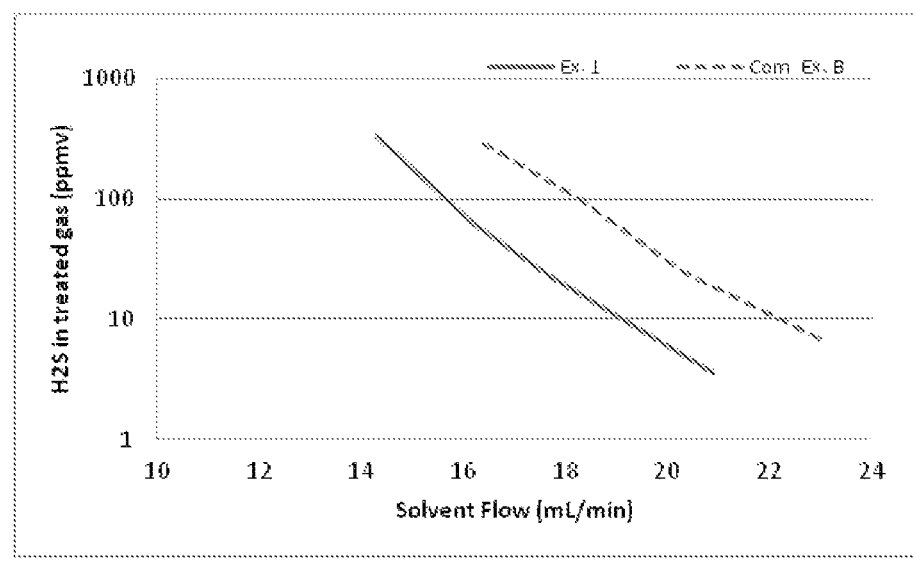
FIG. 4 is a plot of the $CO_2:H_2S$ ratio in a gas mixture treated by an example of the invention and a comparative example.

The results for Example 1 and Comparative Example A is graphically represented in the plot shown in FIG. 2 and the results for Example 1 and Comparative Example B is graphically represented in the plot shown in FIG. 3. $H_2S$ levels, in parts per million by volume (ppmv), are plotted against the amine flow rate in cubic centimeters per minute (cc/min). The $CO_2$:$H_2S$ ratio for Example 1 compared to Comparative Example A is shown in FIG. 4.

What is claimed is:

1. A process for selectively removing hydrogen sulfide from a gas mixture comprising hydrogen sulfide comprising the step of contacting the gaseous mixture with a lean aqueous alkanolamine solution that excludes an acid or acid-forming material characterized as a strong acid that includes an organic or inorganic acid having a pKa of 8 or less and that consists of:
    (i) an amino compound with the formula:

$R^1R^2NCH_2CH(OH)CH_2OH$ wherein $R^1$ and $R^2$ independently represent methyl, ethyl, propyl, or isopropyl groups,
    (ii) bis(2-hydroxyethyl)methylamine,
    (iii) water,
    and
    (iv) optionally an additive that is one or more of a physical solvent, an antifoaming agent, an antioxidant; a corrosion inhibitor, a film former, a chelating agent, or a pH adjuster, provided that the additive is not the acid or an acid-forming material.

2. The aqueous alkanolamine solution of claim 1 wherein the amino compound (i) is 3-(dimethylamino)-1,2-propanediol or 3-(diethylamino)-1,2-propanediol.

3. The process of claim 1 wherein the temperature of the aqueous alkanolamine solution is equal to or greater than 140° F.

4. The process of claim 1 further comprising the step of steam stripping the aqueous alkanolamine solution such that a hydrogen sulfide-lean aqueous alkanolamine solution is formed which may be used in said contacting step.

5. The process of claim 1 wherein
    (i) the amino compound is present in an amount of 0.1 to 75 weight percent,
    (ii) the bis(2-hydroxyethyl)methylamine is present in an amount of from 0.1 to 75 weight percent, and
    (iii) the water is present in an amount from 0.1 to 90 weight percent,
wherein weight percent is based on the total weight of the aqueous alkanolamine solution.

6. The process of claim 5 wherein
    (i) the amino compound is present in an amount greater than 20 weight percent to less than 50 weight percent, and
    (ii) the bis(2-hydroxyethyl)methylamine is present in an amount greater than 1 weight percent to less than 25 weight percent,
wherein weight percent is based on the total weight of the aqueous alkanolamine solution.

* * * * *